United States Patent
Antonisami et al.

(10) Patent No.: US 11,160,427 B2
(45) Date of Patent: Nov. 2, 2021

(54) COVER FOR A FLUFF SCREEN IN A SURFACE TREATMENT APPARATUS

(71) Applicant: SharkNinja Operating, LLC, Needham, MA (US)

(72) Inventors: Bastin Antonisami, Woburn, MA (US); Wenxiu Gao, Suzhou (CN); Robert Yang, Suzhou (CN)

(73) Assignee: SharkNinja Operating LLC, Needham, MA (US)

( * ) Notice: Subject to any disclaimer, the term of this patent is extended or adjusted under 35 U.S.C. 154(b) by 161 days.

(21) Appl. No.: 16/295,403

(22) Filed: Mar. 7, 2019

(65) Prior Publication Data

US 2019/0274501 A1    Sep. 12, 2019

Related U.S. Application Data

(60) Provisional application No. 62/639,857, filed on Mar. 7, 2018.

(51) Int. Cl.
| | |
|---|---|
| *B01D 50/00* | (2006.01) |
| *A47L 9/14* | (2006.01) |
| *A47L 9/12* | (2006.01) |
| *B01D 46/00* | (2006.01) |
| *A47L 9/16* | (2006.01) |
| *B01D 45/16* | (2006.01) |

(Continued)

(52) U.S. Cl.
CPC ............. *A47L 9/1409* (2013.01); *A47L 9/127* (2013.01); *A47L 9/1608* (2013.01); *A47L 9/1683* (2013.01); *B01D 45/16* (2013.01); *B01D 46/0004* (2013.01); *B01D 46/0005* (2013.01); *B01D 46/2403* (2013.01); *B01D 46/4236* (2013.01); *B01D 50/002* (2013.01); *B04C 9/00* (2013.01); *A47L 9/1666* (2013.01); *B01D 2265/026* (2013.01); *B01D 2271/022* (2013.01); *B01D 2275/201* (2013.01); *B01D 2279/55* (2013.01); *B04C 2009/004* (2013.01)

(58) Field of Classification Search
CPC ...... A47L 9/1409; A47L 9/127; A47L 9/1608; A47L 9/1683; A47L 9/1666; B01D 46/0004; B01D 45/16; B01D 50/002; B01D 46/2403; B01D 46/0005; B01D 46/4236; B01D 2275/201; B01D 2279/55; B01D 2265/026; B01D 2271/022; B04C 9/00; B04C 2009/004
See application file for complete search history.

(56) References Cited

U.S. PATENT DOCUMENTS

| 4,199,334 A * | 4/1980 | Berkhoel ............. B01D 46/521 55/304 |
| 5,259,854 A | 11/1993 | Newman |

(Continued)

*Primary Examiner* — Dung H Bui
(74) *Attorney, Agent, or Firm* — Grossman Tucker Perreault & Pfleger, PLLC

(57) ABSTRACT

A vacuum cleaning apparatus may include a debris container and a filtering system. The debris container may define a debris collection chamber and include a dirty air inlet and a clean air outlet. The filtering system may be at least partially disposed in the debris collection chamber, and may include a fluff screen and a fluff screen cover defining a cavity for receiving at least a portion of the fluff screen. The fluff screen and the fluff screen cover may both include tapered outer surfaces. The tapered outer surfaces may have opposing tapers.

18 Claims, 12 Drawing Sheets

(51) Int. Cl.
*B04C 9/00* (2006.01)
*B01D 46/24* (2006.01)
*B01D 46/42* (2006.01)

(56) References Cited

U.S. PATENT DOCUMENTS

| | | |
|---|---|---|
| 6,110,248 A | 8/2000 | Liu |
| 6,192,550 B1 | 2/2001 | Hamada et al. |
| 6,895,632 B2 | 5/2005 | Murray |
| 7,135,051 B2 * | 11/2006 | Baldinger ............... A47L 5/24 55/337 |
| 7,399,332 B1 * | 7/2008 | Morey .................... A47L 9/125 55/318 |
| RE40,542 E | 10/2008 | Coburn et al. |
| 7,788,763 B2 | 9/2010 | Hwang |
| 7,845,046 B2 | 12/2010 | Milligan et al. |
| 8,225,456 B2 * | 7/2012 | Hakan .................. A47L 9/1683 15/344 |
| RE43,603 E | 8/2012 | Coburn et al. |
| 8,308,831 B2 | 11/2012 | Coburn |
| 2004/0034962 A1 * | 2/2004 | Thur ..................... A47L 9/0036 15/353 |
| 2004/0083572 A1 * | 5/2004 | Song ........................ A47L 7/04 15/347 |
| 2005/0081321 A1 * | 4/2005 | Milligan ............... A47L 9/1666 15/344 |
| 2006/0130448 A1 * | 6/2006 | Han ..................... B01D 53/266 55/434.2 |
| 2006/0156508 A1 * | 7/2006 | Khalil .................. A47L 9/1666 15/353 |
| 2006/0207231 A1 * | 9/2006 | Arnold .................... A47L 9/165 55/337 |
| 2007/0144115 A1 * | 6/2007 | Ni ........................ A47L 9/1633 55/322 |
| 2008/0256744 A1 * | 10/2008 | Rowntreer ................ A47L 9/20 15/350 |
| 2012/0222259 A1 * | 9/2012 | Conrad ................. A47L 9/2857 15/347 |
| 2013/0239528 A1 * | 9/2013 | Coulonvaux ...... B01D 46/0046 55/482 |
| 2014/0053367 A1 * | 2/2014 | Conrad ................. A47L 9/1608 15/353 |
| 2014/0096683 A1 * | 4/2014 | Azwell ............. B01D 46/0049 95/268 |

* cited by examiner

14

COVER FOR A FLUFF SCREEN IN A SURFACE TREATMENT APPARATUS

CROSS-REFERENCE TO RELATED APPLICATIONS

The present disclosure claims the benefit of U.S. Provisional Patent Application Ser. No. 62/639,857 filed Mar. 7, 2018, which is fully incorporated herein by reference.

FIELD

The present disclosure is generally directed to surface treatment apparatuses and more specifically to a vacuum cleaner having a fluff screen cover.

BACKGROUND

Surface treatment apparatuses (e.g., vacuum cleaners) may include a dust or debris cup or container for gathering debris drawn into the surface treatment apparatus. The debris may be drawn into the surface treatment apparatus using a vacuum generated by, for example, a suction motor.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

By way of a general overview, the present disclosure features a filtering system for use with a vacuum cleaning apparatus. The vacuum cleaning apparatus may include a debris container defining a debris collection chamber, as well as a dirty air inlet and a clean air outlet. The filtering system may be at least partially disposed in the debris collection chamber, and may include a fluff screen and a fluff screen cover defining a cavity for receiving at least a portion of the fluff screen. The fluff screen and the fluff screen cover may both include tapered outer surfaces (e.g., frustoconical outer surfaces). In at least one example, the outer surface of the fluff screen cover may have a decreasing taper between the top and the bottom, while the fluff screen may have an opposing tapered outer surface. The decreasing taper of the fluff screen cover may allow debris that has wrapped around the fluff screen cover to naturally slide downwardly towards the bottom of the fluff screen cover and towards the bottom of the debris collection chamber due gravity. Additionally, shorter hair may generally be prevented from wrapping around the fluff screen cover and longer hair may only loosely wrap around the fluff screen cover, thereby generally preventing elongated fibers from getting entangled with the fluff screen.

Figure 1A:
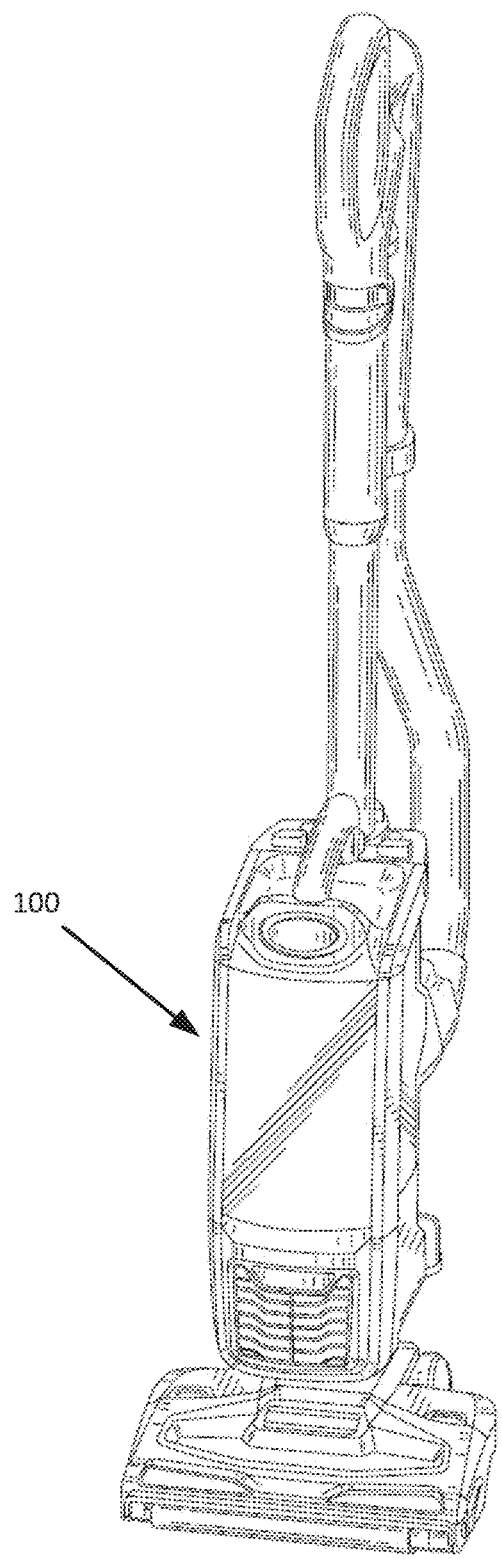
FIG. 1A shows a schematic view of one embodiment of a vacuum cleaning apparatus, consistent with embodiments of the present disclosure.
Figure 1B:
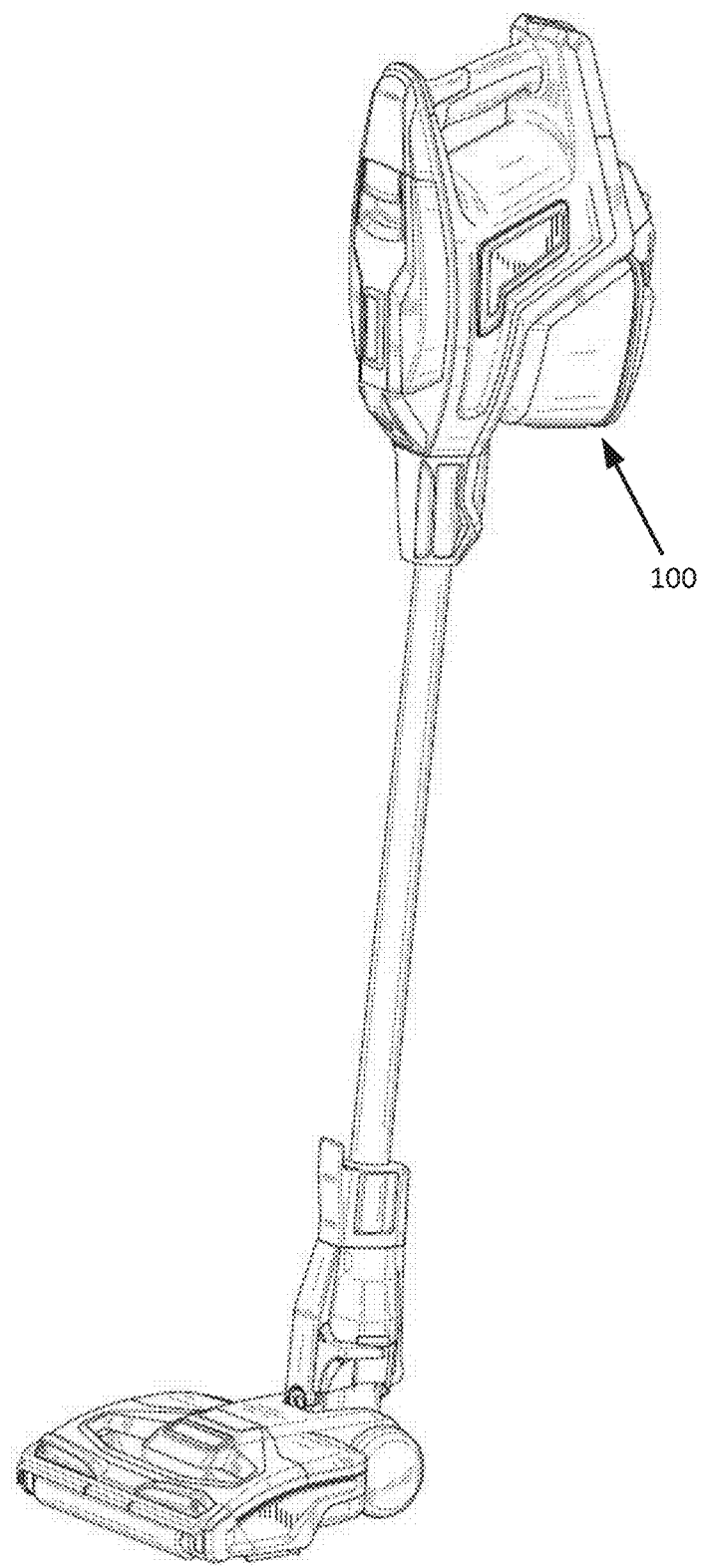
FIG. 1B shows a schematic view of another embodiment of a vacuum cleaning apparatus, consistent with embodiments of the present disclosure.
Figure 1C:
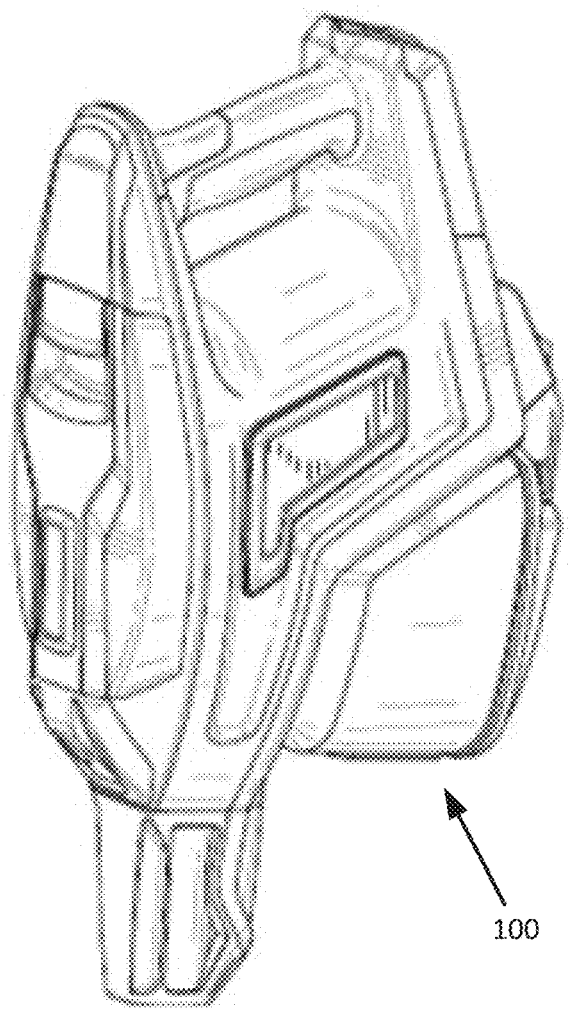
FIG. 1C shows a schematic view of yet another embodiment of a vacuum cleaning apparatus, consistent with embodiments of the present disclosure.
Figure 1D:
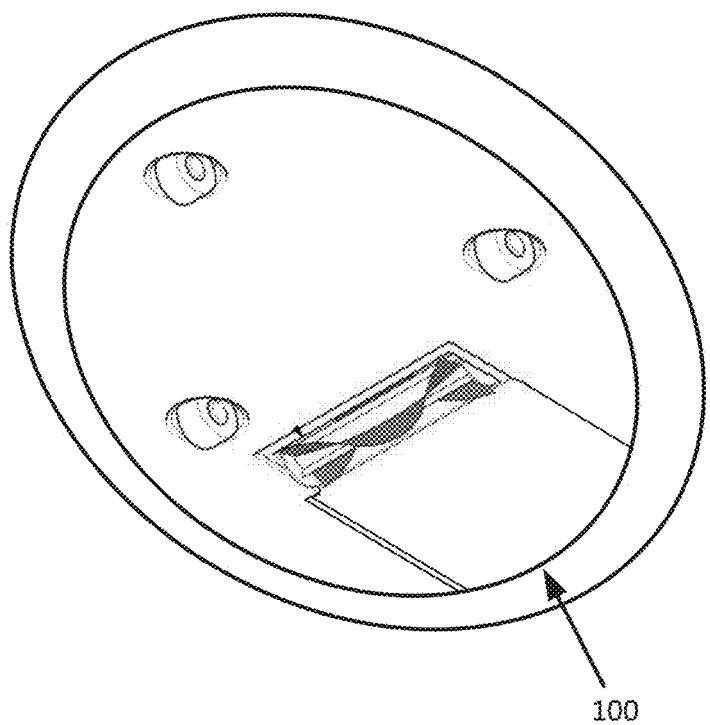
FIG. 1D shows a schematic view of a further embodiment of a vacuum cleaning apparatus, consistent with embodiments of the present disclosure.

As described herein, the present disclosure features filtering systems for use with a vacuum cleaning apparatus. The filtering systems may be used with any vacuum cleaning apparatus known to those skilled in the art. For example, the filtering systems may be used with an upright vacuum cleaning apparatus 10, FIG. 1A, a stick type vacuum cleaning apparatus 12, FIG. 1B, a hand-held vacuum cleaning apparatus 14, FIG. 1C, and/or a robot vacuum cleaning apparatus 16, FIG. 1D. Again, it should be appreciated that these are a non-exhaustive list of exemplary vacuum cleaning apparatuses.

Figure 2:
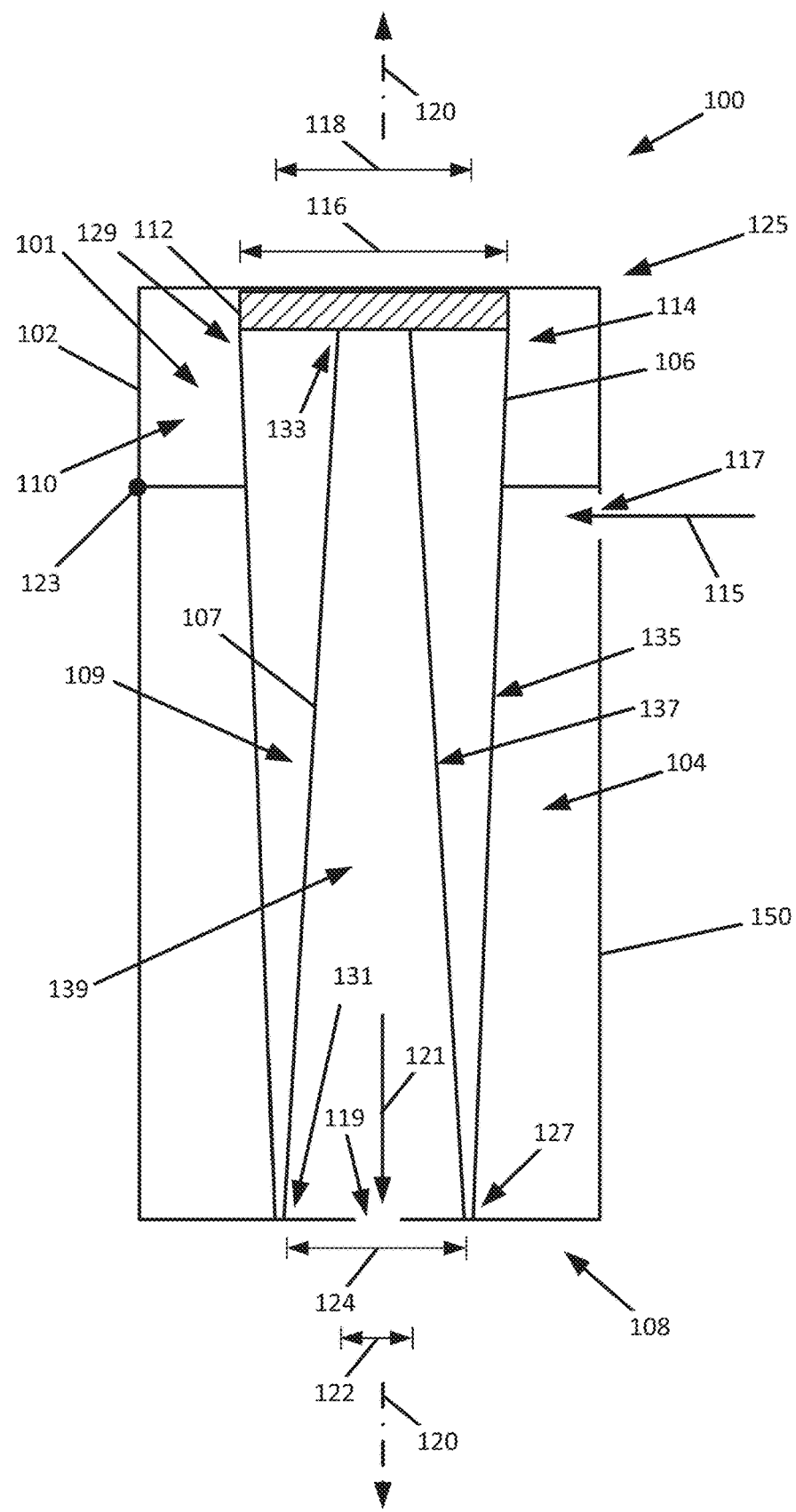
FIG. 2 shows a schematic view of a debris container in a closed position, consistent with embodiments of the present disclosure.
Figure 3:
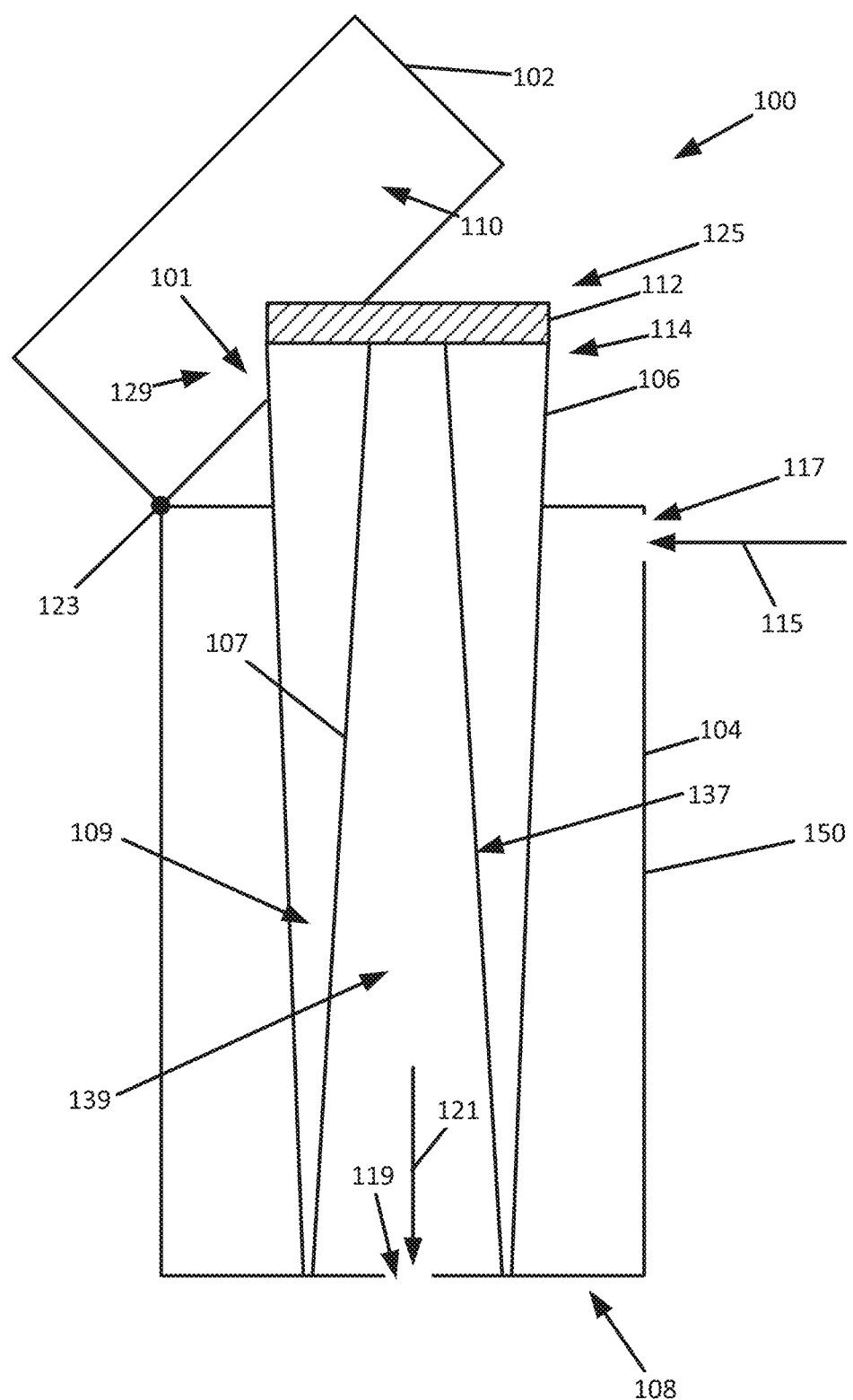
FIG. 3 shows a schematic view of the debris container of FIG. 2 in an open position, consistent with embodiments of the present disclosure.

The vacuum cleaning apparatus may include debris container (also referred to as a debris or dust cup). The debris container may be permanently or removably mounted, coupled, and/or otherwise secured to the vacuum cleaning apparatus. FIGS. 2-3 show a cross-sectional view of one example of a debris container 100. While aspects/embodiments of the debris container 100 may be described in the context of a removable debris container 100, it should be appreciated that debris containers may be a permanent component of the vacuum cleaning apparatus and debris containers consistent with the present disclosure are not limited to the debris containers shown in the figures unless specifically claimed as such.

The debris container 100 defines one or more debris collection chambers 104 configured to receive debris (e.g., dust, dirt, hair, or the like). The debris container 100 includes one or more dirty air inlets 117 configured to be fluidly coupled to a dirty air stream 115, one or more filtering systems 101, and one or more clean air outlets 119. In practice, the dirty air stream 115 (which may be generated by one or more vacuum pumps/fans associated with the vacuum cleaning apparatus, not shown for clarity) enters into the debris collection chambers 104 where at least some of the debris entrained in the dirty air stream 115 is removed by the filtering systems 101 and the resulting clean air stream 121 exits the debris collection chambers 104. In the illustrated examples, the filtering system 101 may be used with a vacuum cleaning apparatus that generates a cyclone filtering pattern inside the debris collection chambers 104; however, it should be appreciated that the filtering system 101 may be used with a non-cyclone vacuum cleaning apparatus.

As shown, the debris container 100 optionally includes a body 150 and a debris container cover 102 that is configured to move between a closed position (FIG. 2) and an open closed position (FIG. 3). For example, the debris container cover 102 may be coupled to the body 150 by way of one or more hinges 123 or the like. In the illustrated example, the debris container cover 102 includes a cavity 110 that forms part of the debris collection chamber 104; however, it should be appreciated that the debris container cover 102 may not include cavity 110, and instead the debris container cover 102 may merely form one end of the debris collection chamber 104.

The filtering system 101 may be at least partially disposed within the debris collection chamber 104. The filtering system 101 includes a fluff screen cover 106 and a fluff screen (or vortex finder) 107. The fluff screen cover 106 defines a screen cavity 109 that is configured to receive at least a portion of the fluff screen 107. In other words, the fluff screen cover 106 may generally be described as enclosing the fluff screen 107. In the illustrated example, the fluff screen cover 106 is shown extending from a first end 108 of the debris collection chamber 104 to a second end 125 (e.g., into the cavity 110 defined in the debris container cover 102); however, it should be appreciated that the filtering system 101 (e.g., the fluff screen cover 106) may be located anywhere in the debris collection chamber 104.

Optionally, a compressible material 112 may be disposed between a distal end 114 of the fluff screen cover 106 and inside of the debris container cover 102. The compressible material 112 may be a porous material (e.g., a foam) or a rubber. When the debris container cover 102 is transitioned from the open position (e.g., FIG. 3) to the closed position (e.g., FIG. 2), the debris container cover 102 may engage the compressible material 112 such that the debris container cover 102 compresses the compressible material 112 against the fluff screen cover 106. By compressing the compressible material 112 between the debris container cover 102 and the fluff screen cover 106, the amount of vibration of components within the debris container 100 may be reduced. As a result, the noise generated due to vibration between debris container 100 (e.g., the debris container cover 102) and the filtering system 101 (e.g., the fluff screen cover 106) may also be reduced. For example, the compressing of the compressible material 112 may reduce the sound generated by at least 1 dBA.

The fluff screen cover 106 may include a filtering surface 135 which at least partially defines the screen cavity 109. The filtering surface 135 is configured to allow air inside the debris collection chamber 104 (e.g., the dirty air stream 115) to flow through it while also preventing at least some debris within the collection chamber 104 from passing through the fluff screen cover 106 into the screen cavity 109. The fluff screen cover 106 may include a first end region 127 disposed proximate to the first end 108 of the debris collection chamber 104 and a second end region 129 disposed proximate to the second end 125 of the debris collection chamber 104. In the illustrated example, the second end region 129 may be disposed proximate to the dirty air inlet 117 and/or top of the debris container 100, while the second end region 127 may be disposed proximate to the base or bottom of the debris container 100, though it should be appreciated that the present disclosure is not limited to this configuration unless specifically claimed as such.

In some instances, a first cross-sectional size 118 of the first end region 127 (also generally referred to herein as the upper width 118) is smaller than a second cross-sectional size 116 (also generally referred to herein as the lower width 116) of the second end region 129. In other words, the outer surface of the fluff screen cover 106 may have a decreasing taper along the longitudinal axis 120 of the fluff screen cover 106 from the upper width 116 to the lower width 118. In at least one example, the outer surface of the fluff screen cover 106 may have generally frustoconical shape.

The decreasing taper of the fluff screen cover 106 between the top (e.g., second end region 129) and the bottom (e.g., first end region 127) of the fluff screen cover 106 may facilitate the removal of debris that builds up on the outer surface of the fluff screen cover 106. For example, elongated debris (such as, but not limited to, hair, fur, or the like) that wraps around the outer surface of the fluff screen cover 106 may naturally slide downwardly towards the bottom of the fluff screen cover 106 and towards the bottom of the debris collection chamber 104 due gravity and the decreasing taper of the fluff screen cover 106 (particularly when the vacuum cleaning apparatus has been turned off). Consequently, performance of the filter system 101 may be improved. Additionally, the decreasing taper of the fluff screen cover 106 may make it easier for a user to manually clean the fluff screen cover 106 since the wrapped debris will become looser as the user slides the wrapped debris towards the first end 127. Moreover, the decreasing taper of the fluff screen cover 106 may mitigate the quantity of elongated fibers (e.g., hair or string) that wrap around the fluff screen cover 106. For example, shorter hair may generally be prevented from wrapping around the fluff screen cover 106 and longer hair may only loosely wrap around the fluff screen cover 106. This may prevent elongated fibers from getting entangled with the fluff screen 107.

Similar to the fluff screen cover 106, the fluff screen 107 includes a filtering surface 137 which at least partially defines the clean air cavity 139. At least a portion of the fluff screen 107 is disposed within the screen cavity 109. The filtering surface 137 is configured to allow air and/or debris inside the screen cavity 109 (e.g., air and/or debris that passes through the fluff screen cover 106) to flow through it while also preventing at least some debris within the screen cavity 109 from passing through the fluff screen 107 into the clean air cavity 139. The fluff screen 107 include a first end region 131 disposed proximate to the first end 108 of the debris collection chamber 104 and a second end region 133 disposed proximate to the second end 125 of the debris collection chamber 104. In some instances, a first cross-sectional size 124 (also generally referred to herein as the lower width 124) of the first end region 131 is larger than a second cross-sectional size 122 (also generally referred to herein as the upper width 122) of the second end region 133. In other words, the outer surface of the fluff screen 107 may have an increasing taper along the longitudinal axis 120 of the fluff screen 107 from the upper width 124 to the lower width 122. In at least one example, the outer surface of the fluff screen 107 may have generally frustoconical shape. The fluff screen 107 and the fluff screen cover 106 may optionally be concentrically aligned along a common longitudinal axis 120.

In some instances, the fluff screen cover 106 and the fluff screen 107 may have opposing and/or diverging tapers. In other words, the upper width 116 of the fluff screen cover 106 may be larger than the lower width 118 of the fluff screen cover 106, and the upper width 122 of the fluff screen 107 may be larger than the lower width 124 of the fluff screen 107. When the fluff screen 107 and the fluff screen cover 106 have opposing the tapers, the efficiency of the cyclone generated within the debris container 100 may be improved. For example, a width/diameter of the fluff screen cover 206 may be largest at the dirty air inlet 117 to the debris container 100 and smallest proximate to the clean air outlet 119 of the debris container 100. Since the fluff screen 107 decreasingly tapers from the upper end 129 toward the lower end 127, the dirty air stream 115 (which may enter proximate to the upper end 129) will generally flow downwardly towards the lower end 127, thereby improving the cyclone generated within the debris container 100. As such, the fluff screen cover 106 may be configured to direct airflow to improve the efficiency of the cyclone. Further, the tapered outer shape of the fluff screen 107 increases the surface area compared to a straight or linear design. As a result, the filtering surface area (e.g., the surface area of the fluff screen 107 that is porous) may be increased. The resulting increase in the filtering surface area (e.g., the area of the mesh screen) may improve the efficiency of the cyclone generated within the debris container 100. In some instances, the efficiency of the cyclone may be improved by at least nine air watts (AW) (e.g., as measured at an inlet of the surface treatment apparatus), when compared to cyclone that does not utilize the fluff screen cover 106.

While the fluff screen cover 106 has been illustrated having a decreasing tapered outer surface, the fluff screen cover 106 may have linear outer surface (e.g., the upper width 116 and the lower width 118 may be substantially the same) or may have an increasing tapered outer surface (e.g., the upper width 118 may be less than the lower width 116).

In some instances, the fluff screen cover 106 may be removable such that a user may replace or clean the fluff screen cover 106. The fluff screen cover 106 may be configured to couple to the fluff screen 107 when inserted into the debris collection chamber 104. For example, the fluff screen cover 106 may be coupled to the fluff screen 107 in response to the debris container cover 102 being transitioned from the open position to the closed position. Such coupling may be the result of, for example, the debris container cover 102 engaging the compressible material 112. The fluff screen cover 106 may be decoupled from the fluff screen 107 by actuation of a lever or button or by an application of a force along a longitudinal axis 120 of the fluff screen cover 106 in a direction of the debris container cover 102.

Figure 4:
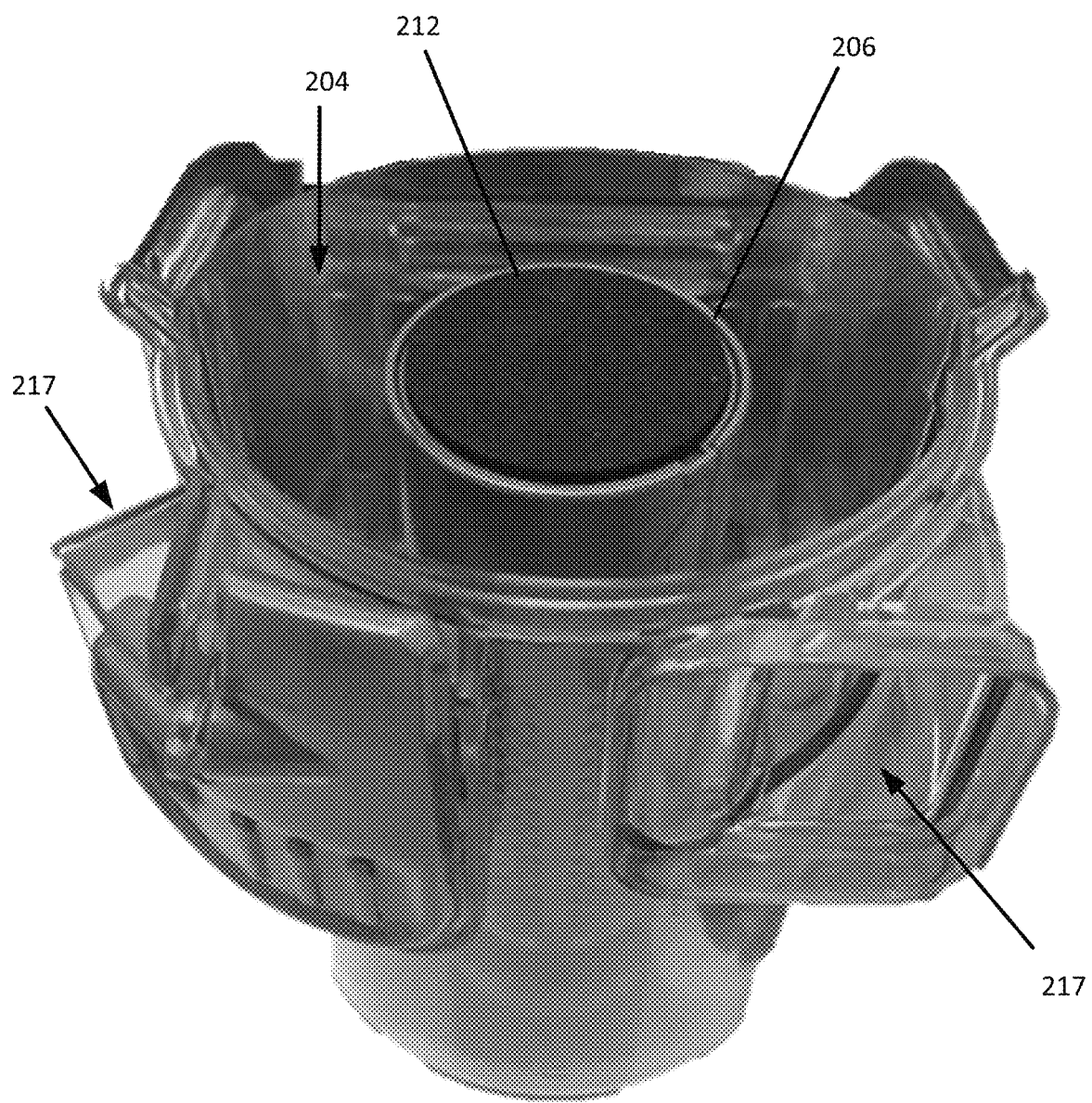
FIG. 4 shows a top perspective view of a debris container without a debris container cover, consistent with embodiments of the present disclosure.
Figure 5:
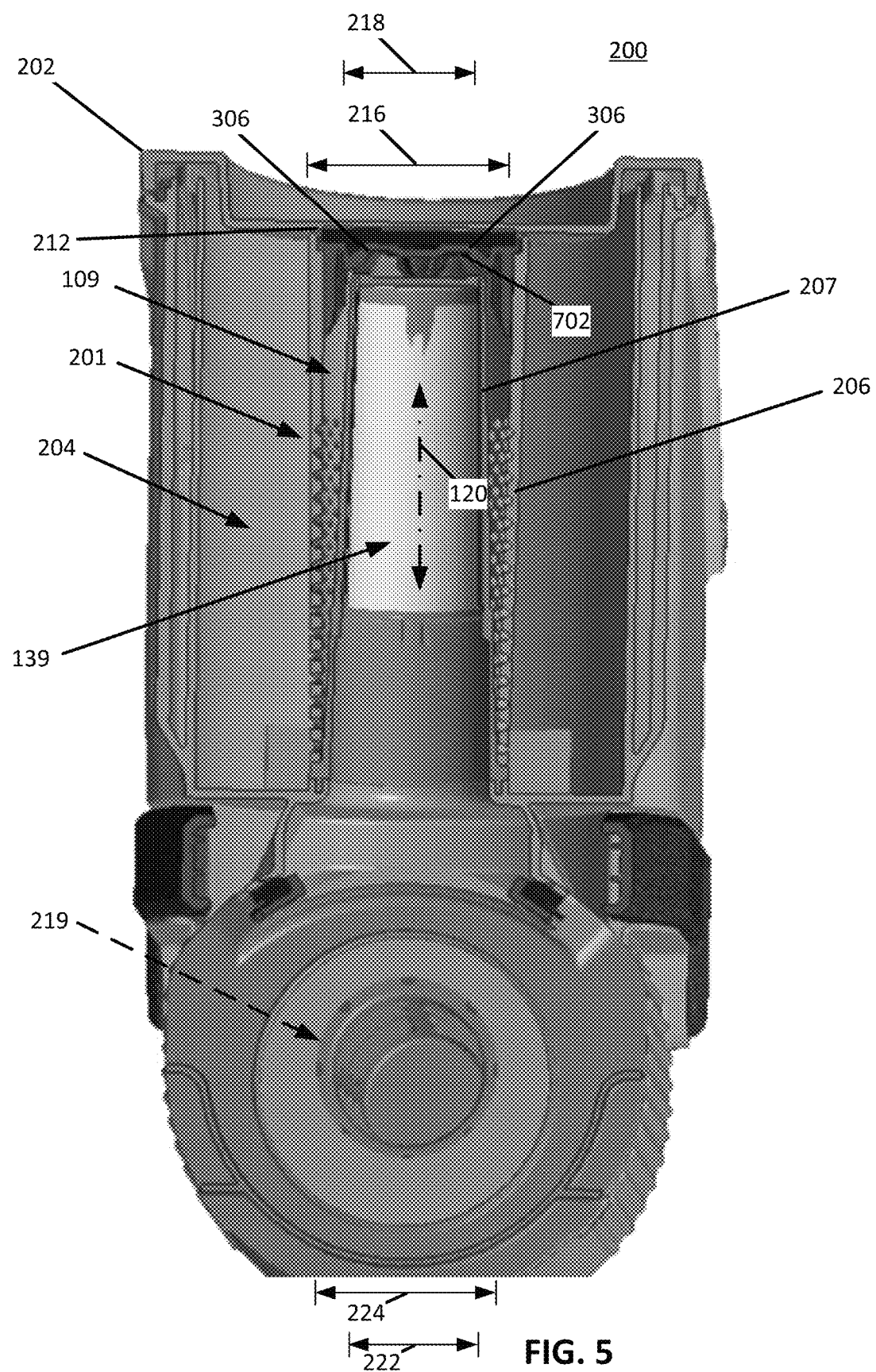
FIG. 5 shows a cross-sectional view of the debris container with a debris container cover in the closed position and with the bottom or base of the debris container in an open or empty position, consistent with embodiments of the present disclosure.
Figure 6:
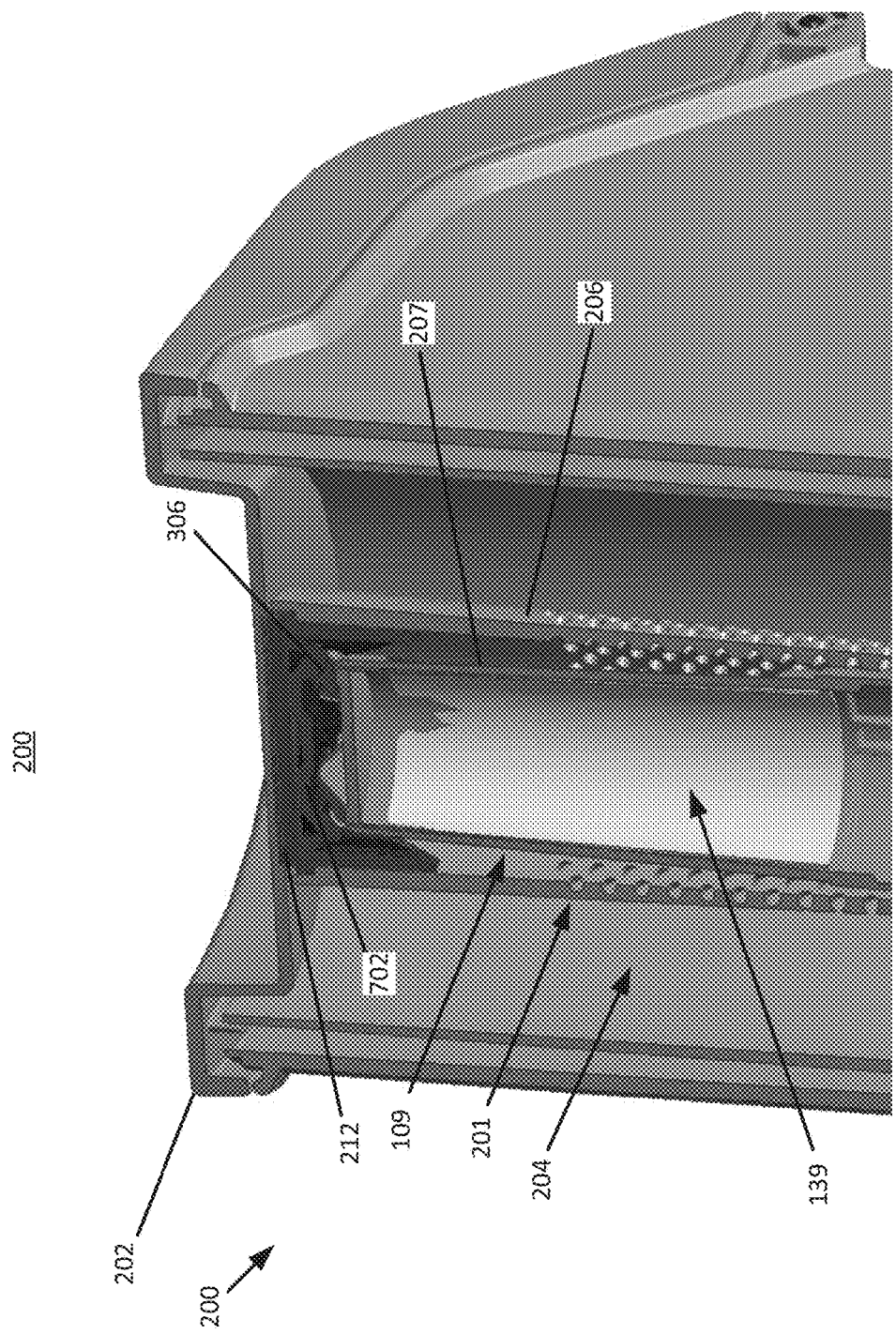
FIG. 6 shows a partial, perspective cross-sectional view of the debris container with a debris container cover in the closed position, consistent with embodiments of the present disclosure.

FIGS. 4-6 show various views of a debris container 200, which may be consistent with the debris container 100 of FIGS. 2-3. In particular, FIG. 4 is a top perspective view of the debris container 200 without a debris container cover, FIG. 5 is a cross-sectional view of the debris container 200 with a debris container cover 202 in the closed position and with the bottom or base 208 of the debris container 200 in an open or empty position, and FIG. 6 is a partial, perspective cross-sectional view of the debris container 200 with a debris container cover 202 in the closed position. As shown, the debris container 200 includes the debris container cover 202 configured to transition between an opened and closed position, one or more dirty air inlets 217, one or more clean air outlets 219, and a debris collection chamber 204. The filtering system 201 may be at least partially disposed within the debris collection chamber 204. The filtering system 201 may include a fluff screen cover 206 configured to enclose a fluff screen (or vortex finder) 207. As shown, a foam pad 212 may be disposed between the debris container cover 202 and the fluff screen cover 206 such that when the debris container cover 202 is in the closed position (e.g., as shown in FIGS. 5 and 6), the debris container cover 202 compresses the foam pad 212. The compression of the foam pad 212 may reduce the vibration within debris container 200 and/or the sound generated as a result of any vibration within the debris container 200. For example, the sound level may be reduced by at least 1 dBA. As can be best seen in FIG. 5, the fluff screen cover 206 and the fluff screen 207 may have opposing tapers. In other words, the upper width 216 of the fluff screen cover 206 may be larger than the lower width 218 of the fluff screen cover 206, and the upper width 222 of the fluff screen 207 may be larger than the lower width 224 of the fluff screen 207.

Figure 7:
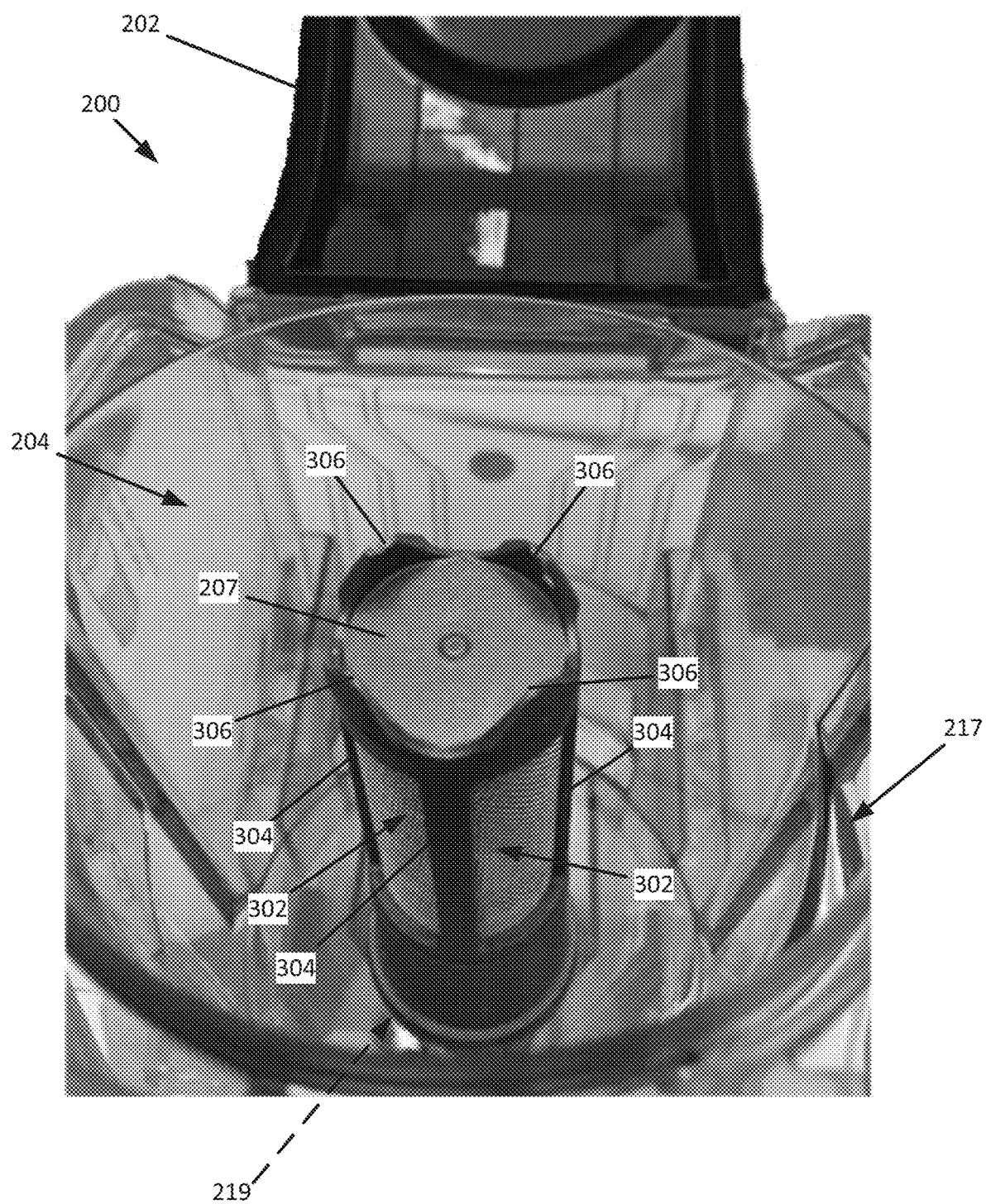
FIG. 7 shows a perspective view of a fluff screen within the debris collection chamber, consistent with embodiments of the present disclosure.

Turning now to FIG. 7, a perspective view of a fluff screen 207 within the debris collection chamber 204. As shown, the fluff screen 207 includes one or more exposed mesh regions 302 and one or more ribs 304 extending between the exposed mesh regions 302. The efficiency of the cyclone generated in the debris container 200 may be increased by increasing the surface area of the exposed mesh regions 302. Additionally, or alternatively, the efficiency of the cyclone may be increased by including the fluff screen cover 206 (see FIGS. 4-6). In some instances, a diameter of the fluff screen 207 may be smallest at the dirty air inlet 217 to the debris container 200 and largest at a clean air outlet 219 of the debris container 200.

Figure 8:
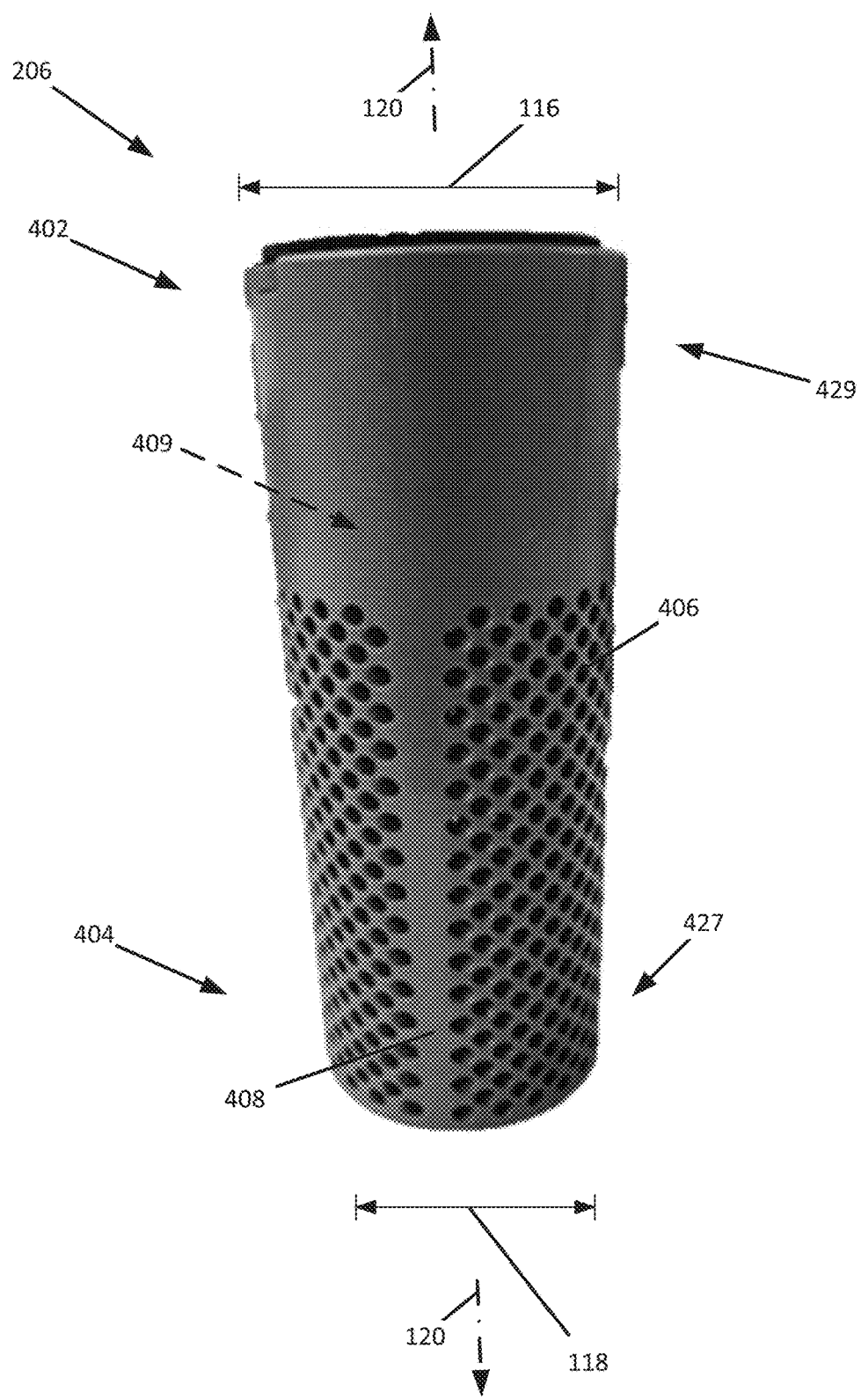
FIG. 8 shows a side perspective view of the fluff screen cover, consistent with embodiments of the present disclosure.
Figure 9:
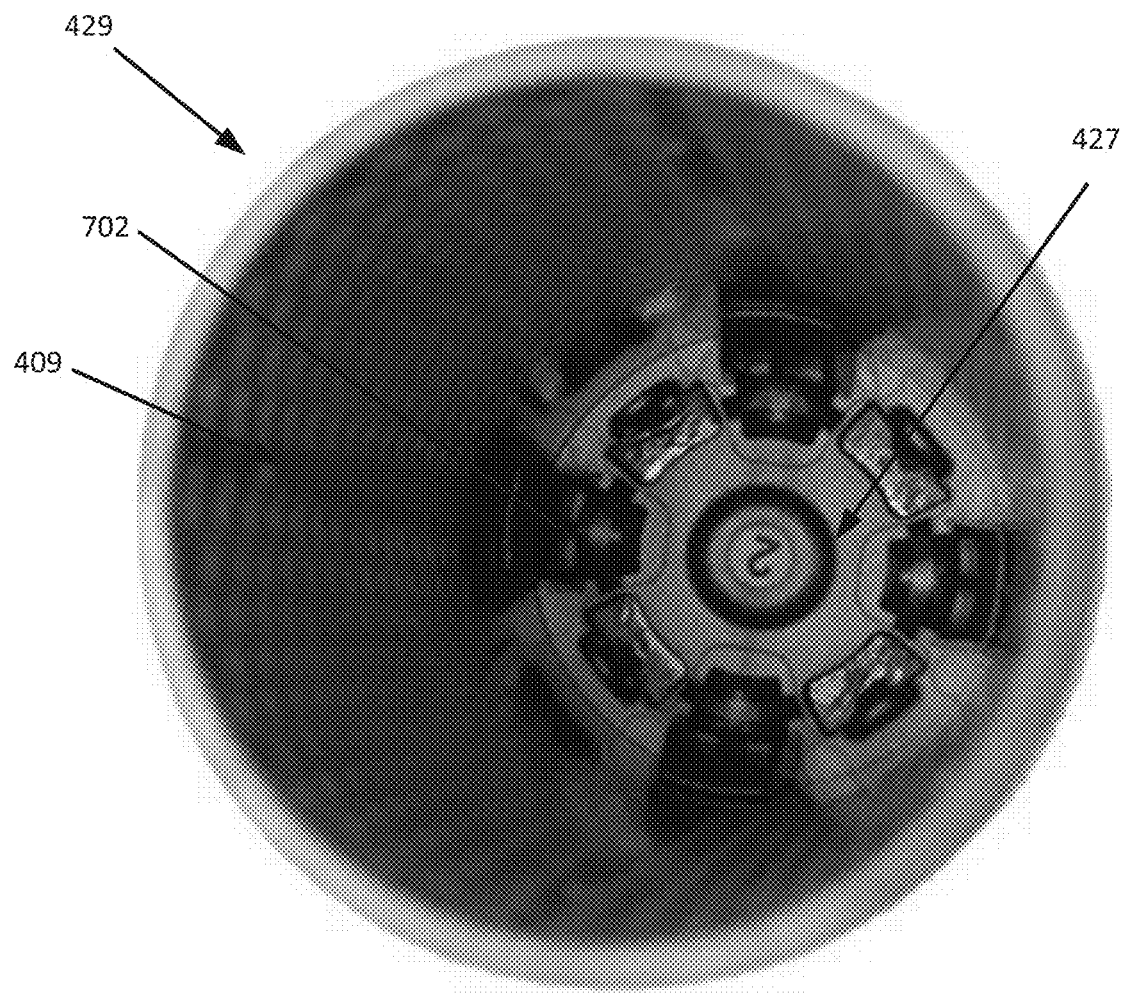
FIG. 9 shows an end perspective view of the fluff screen cover, consistent with embodiments of the present disclosure.

FIGS. 8-9 show an example of the fluff screen cover 206. In particular, FIG. 8 is a side perspective view of the fluff screen cover 206 and FIG. 9 is an end perspective view of the fluff screen cover 206. As shown, the fluff screen cover 206 may include an upper portion 402 that is configured to be disposed adjacent (e.g., proximate to) the top 125 of the debris container 200 and/or the dirty air inlet 217, and a bottom portion 404 that is configured to be disposed proximate to the base or bottom 108 of the debris container 200. As shown, the bottom portion 404 may include a plurality of openings 406 extending into a screen cavity 409 of the fluff screen cover 206, wherein the screen cavity 409 is configured to receive the fluff screen 207. The plurality of openings 406 may generally be described as collective forming a meshed region. Optionally, the upper portion 402 may not include any openings extending into the screen cavity 409. In other words, the upper portion 402 includes a substantially continuous surface. By not including openings in the upper portion 402, it may be possible to influence the flow of the cyclone to, for example, improve the efficiency of the cyclone.

The fluff screen cover 206 may optionally include one or more ribs 408 extending longitudinally along the fluff screen cover 206. The ribs 408 may separate the plurality of openings 406 such that a plurality of meshed regions can be formed. The ribs 408 of the fluff screen cover 206 may align with the ribs 304 of the fluff screen 207.

With reference to FIGS. 5-7, the fluff screen 207 may include retaining features 306 configured to engage corresponding retaining features 702 (FIG. 9) of the fluff screen cover 206. In some instances, when the fluff screen cover 206 is placed over the fluff screen 207, the retaining features 306 may urge the fluff screen cover 206 to a desired alignment/orientation that improves and/or optimizes the efficiency of the cyclone. For example, the retaining features 306, 702 may include a plurality of castellations (e.g., protrusions and/or tabs) configured to engage with a plurality of recesses. The plurality of castellations may include a shape/contour configured to be received in the plurality of recesses and to align the plurality of castellations in a predetermined orientation with respect to the plurality of recesses. In at least one example, the plurality of castellations and the plurality of recesses may be spaced apart from each other such that the plurality of castellations only align with the plurality of recesses in one orientation (e.g., the plurality of castellations and the plurality of recesses may be keyed with respect to each other). While the retaining features 306 of the fluff screen 207 have been illustrated as a plurality of plurality of castellations and the retaining features 702 of the fluff screen cover 206 are illustrates as a plurality of plurality of recesses, it should be appreciated that the retaining features 306, 702 of the present disclosure are not limited to plurality of castellations/recesses, nor are the plurality of castellations and plurality of recesses limited to the relationship shown in the figures (e.g., the plurality of castellations may be disposed on the fluff screen cover 206 and the plurality of recesses may be disposed on the fluff screen 207). In at least one example, the retaining features 306 may orient the ribs 408 to align with the ribs 304 when the debris container cover 202 is transitioned to the closed position, causing the fluff screen cover 206 to couple to the fluff screen 207.

Accordingly, a filtering system, consistent with embodiments disclosed herein, may improve the suction and/or efficiency provided by a vacuum cleaning apparatus, facilitate cleaning/maintenance of the vacuum cleaning apparatus, and/or reduce noise of the vacuum cleaning apparatus.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. It will be appreciated by a person skilled in the art that a vacuum cleaning apparatus may embody any one or more of the features contained herein and that the features may be used in any particular combination or sub-combination. Modifications and substitutions by one of ordinary skill in the art are considered to be within the scope of the present invention, which is not to be limited except by the following claims.

What is claimed is:

1. A vacuum cleaning apparatus comprising:
    a debris container, the debris container defining a debris collection chamber and including a dirty air inlet and a clean air outlet; and
    a filtering system at least partially disposed in the debris collection chamber, the debris container and the filtering system being configured to generate a cyclone within the debris container, the filtering system including:
        a removable fluff screen cover including a first filtering surface that at least partially defines a screen cavity; and
        a fluff screen at least partially received within the screen cavity, the fluff screen being configured to substantially cover the clean air outlet, the fluff screen including a second filtering surface, the first filtering surface and the second filtering surface being configured to allow air to pass therethrough, the first and second filtering surfaces being further configured to collect at least a portion of debris entrained within the air passing therethrough, wherein the second filtering surface of the fluff screen includes one or more mesh regions extending between a plurality of ribs, the one or more mesh regions including a mesh screen.

2. The vacuum cleaning apparatus of claim 1, wherein the fluff screen cover includes a tapered outer surface.

3. The vacuum cleaning apparatus of claim 2, wherein the fluff screen cover has a first end region proximate to the dirty air inlet and a second end region proximate to the clean air outlet, wherein the tapered outer surface of the fluff screen cover has a taper which decreases from the first end region to the second end region.

4. The vacuum cleaning apparatus of claim 1, wherein the fluff screen and the fluff screen cover both include tapered outer surfaces.

5. The vacuum cleaning apparatus of claim 4, wherein the fluff screen and the fluff screen cover include opposing tapered outer surfaces.

6. The vacuum cleaning apparatus of claim 5, wherein the fluff screen and the fluff screen cover are concentrically aligned along a common longitudinal axis.

7. The vacuum cleaning apparatus of claim 4, wherein the fluff screen cover has a first end region proximate to the dirty air inlet and a second end region proximate to the clean air outlet, wherein the outer surface of the fluff screen cover has a taper which decreases from the first end of the fluff screen cover to the second end region of the fluff screen cover; and
    wherein the fluff screen has a first end region proximate to the dirty air inlet and a second end region proximate to the clean air outlet, wherein the outer surface of the fluff screen has a taper which increases from the first end of the fluff screen to the second end region of the fluff screen.

8. The vacuum cleaning apparatus of claim 1, wherein the fluff screen further comprises a retainer configured to couple the fluff screen cover to the fluff screen.

9. The vacuum cleaning apparatus of claim 1, wherein the debris container further comprises a debris container cover.

10. The vacuum cleaning apparatus of claim 9, wherein the debris container further comprises a compressible member disposed between the debris container cover and the fluff screen cover when the debris container cover in a closed position.

11. The vacuum cleaning apparatus of claim 10, wherein the fluff screen further comprises a retainer configured to couple the fluff screen cover to the fluff screen in response to transitioning the debris container cover to the closed position.

12. The vacuum cleaning apparatus of claim 1, wherein the fluff screen is configured to engage the fluff screen cover to align the fluff screen cover relative to the fluff screen.

13. The vacuum cleaning apparatus of claim 12, wherein one of the fluff screen and the fluff screen cover include a plurality of castellations configured to engage with and a plurality of recesses to align the fluff screen cover relative to the fluff screen.

14. The vacuum cleaning apparatus of claim 13, wherein the fluff screen and the fluff screen cover each include at least one rib extending along a longitudinal axis of the filtering system, wherein the plurality of castellations and the plurality of recesses align the ribs relative to each other.

15. The vacuum cleaning apparatus of claim 1, wherein the fluff screen cover has a first end region proximate to the dirty air inlet and a second end region proximate to the clean air outlet, wherein second end region includes a plurality of openings configured to allow air to pass through and wherein the first end region is configured to generally prevent air from pass through.

16. The vacuum cleaning apparatus of claim 15, wherein an outer surface of the fluff screen cover has a taper which decreases from the first end region to the second end region.

17. The vacuum cleaning apparatus of claim 1, wherein the fluff screen and the fluff screen cover both have a generally frustoconical shape.

18. The vacuum cleaning apparatus of claim 1, wherein the debris container is removably coupled to the vacuum cleaning apparatus.

* * * * *